United States Patent
Li et al.

(10) Patent No.: US 11,159,762 B2
(45) Date of Patent: Oct. 26, 2021

(54) DISPLAY DEVICE AND SPEAKER ASSEMBLY

(71) Applicant: HISENSE VISUAL TECHNOLOGY CO., LTD., Qingdao (CN)

(72) Inventors: Kuibao Li, Qingdao (CN); Weicai Huang, Qingdao (CN); Haiying Wang, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/868,435

(22) Filed: May 6, 2020

(65) Prior Publication Data

US 2021/0136313 A1 May 6, 2021

Related U.S. Application Data

(63) Continuation of application No. PCT/CN2020/075956, filed on Feb. 20, 2020.

(30) Foreign Application Priority Data

Nov. 4, 2019 (CN) .......................... 201911067363.6
Dec. 10, 2019 (CN) .......................... 201911258230.7

(51) Int. Cl.
*H04R 1/02* (2006.01)
*H04N 5/64* (2006.01)
(Continued)

(52) U.S. Cl.
CPC ........... *H04N 5/642* (2013.01); *G06F 1/1605* (2013.01); *H04R 1/028* (2013.01); *H04R 5/02* (2013.01); *H04R 2499/15* (2013.01)

(58) Field of Classification Search
CPC ...... H04N 5/642; G06F 1/1605; H04R 1/028; H04R 5/02
See application file for complete search history.

(56) References Cited

U.S. PATENT DOCUMENTS 5,147,986 A * 9/1992 Cockrum ............. H04R 1/2842
181/145
5,818,942 A * 10/1998 Freadman ................ H04R 5/02
381/300

(Continued)

FOREIGN PATENT DOCUMENTS

CN   101212824 A   7/2008
CN   202172482 U   3/2012

(Continued)

OTHER PUBLICATIONS

The international search report of international application No. PCTCN2020075956.
The first Office Action of CN application No. 2019112582307.

*Primary Examiner* — Simon King
(74) *Attorney, Agent, or Firm* — J.C. Patents

(57) ABSTRACT

A display device and a speaker assembly are provided, the speaker assembly is located in a first rear housing or a second rear housing and includes a shell, a first speaker unit and a second speaker unit, the shell has a cavity, the cavity has a baffle disposed therein, the cavity is divided into a first cavity and a second cavity by the baffle, the first speaker unit and the second speaker unit are respectively located in the first cavity and the second cavity, and the speaker has a relatively low degree of distortion and a relatively high reliability.

19 Claims, 8 Drawing Sheets

(51) Int. Cl.
    *G06F 1/16*   (2006.01)
    *H04R 5/02*   (2006.01)

(56)            References Cited

U.S. PATENT DOCUMENTS

| | | | |
|---|---|---|---|
| 2003/0066705 A1* | 4/2003 | Schott | H04R 1/2842 |
| | | | 181/156 |
| 2003/0103637 A1* | 6/2003 | Huang | H04R 1/1075 |
| | | | 381/309 |
| 2011/0311086 A1 | 12/2011 | Nakamura | |
| 2014/0177902 A1 | 6/2014 | Yeh | |
| 2015/0055027 A1* | 2/2015 | Suzuki | G06F 1/1605 |
| | | | 348/794 |
| 2017/0255442 A1* | 9/2017 | Kim | G06F 1/1647 |
| 2019/0227591 A1* | 7/2019 | Youn | G06F 1/1605 |
| 2019/0335258 A1* | 10/2019 | Vaturi | G06F 1/1616 |

FOREIGN PATENT DOCUMENTS

| | | |
|---|---|---|
| CN | 102420955 A | 4/2012 |
| CN | 106791528 A | 5/2017 |
| CN | 108958693 A | 12/2018 |
| CN | 208540153 U | 2/2019 |
| CN | 110022509 A | 7/2019 |
| CN | 209089159 U | 7/2019 |
| CN | 110944273 A | 3/2020 |
| JP | 1105296 U | 7/1989 |

\* cited by examiner

DISPLAY DEVICE AND SPEAKER ASSEMBLY

CROSS-REFERENCE TO RELATED APPLICATIONS

This application is a continuation of International Application No. PCT/CN2020/075956, filed on Feb. 20, 2020, which claims priority to Chinese Patent Application No. 201911067363.6 filed on Nov. 4, 2019 and Chinese Patent Application No. 201911258230.7 filed on Dec. 10, 2019. The contents of the aforementioned patent applications are incorporated herein by reference in their entireties.

TECHNICAL FIELD

The present disclosure relates to the technical field of display and, in particular, to a display device and a speaker assembly.

BACKGROUND

A speaker is an energy conversion component that converts an electric signal into a sound signal, and the performance of a speaker has a significant influence on sound quality. The speaker is a component in a sound equipment that attracts least attention, while in terms of sound effect it is one of the most important parts. Via electromagnetic, piezoelectric, or electrostatic effect, audio electric energy makes a cone or a membrane of a speaker vibrate and generates a resonance with surrounding air so as to make a sound.

In a multichannel sound equipment, speakers for different sound channels are responsible for sound playback. Taking a speaker system with a 4.2.2-channel as an example, the speaker system includes two woofer speakers, two height channel speakers, two main channel speakers and two side surround speakers. The main channel speakers and the side surround speakers can be integrally designed, i.e. the main channel speakers and the side surround speakers can be disposed in the same box. In a general design, in order to ensure a sound articulation of the side surround speakers, the box of soundbar is generally designed as a closed box.

However, when the soundbar with the closed box is working, due to an air pressure difference between inside and outside of the box, the amplitude deviation of the speaker may occur and the sound produced by the speaker may distort, thereby adversely affecting reliability of the speaker.

SUMMARY

The present disclosure provides a display device, a speaker of the display device which allows for a lower degree of distortion, a higher reliability, a low wind noise, and a good low-frequency effect.

In some embodiments, the disclosure provides a display device, including:
  a first panel, configured to display a first image;
  a second panel, configured to display a second image;
  a first rear housing, configured to cover the first panel;
  a second rear housing, configured to cover the second panel; and
  a speaker assembly, located in the first rear housing and/or the second rear housing, where the speaker assembly includes a first speaker unit and a second speaker unit.

In some embodiments, the speaker assembly further includes a shell, wherein the shell has a cavity, the cavity has a baffle disposed therein, the cavity is divided into a first cavity and a second cavity by the baffle, and the first speaker unit and the second speaker unit are respectively located in the first cavity and the second cavity; wherein the first cavity is in communication with outside, and at least one communicating pore for connecting the second cavity with the first cavity is disposed on the baffle.

In some embodiments, a phase-inverter tube for connecting the first cavity with the outside is disposed on the shell.

In some embodiments, the first speaker is configured to output sound in a first direction, the second speaker is configured to output sound in a second direction, different from the first direction.

In some embodiments, the first direction is right in front of the display device, and the second direction is diagonally in front of the display device.

In some embodiments, a diameter of the communicating pore is between 0.5 mm and 2.0 mm.

In some embodiments, the communicating pore comprises a plurality of the communicating pores, and the diameter of the communicating pore is smaller than a thickness of the baffle.

In some embodiments, the diameter of the communicating pore is larger than 2.0 mm, and the communicating pore is covered with a damping screen.

In some embodiments, the communicating pore has a communicating tube for connecting the second cavity and the first cavity.

In some embodiments, the first speaker unit is a main channel speaker unit, and the second speaker unit is a side surround speaker unit.

In some embodiments, the main channel speaker unit includes two full-frequency speakers and a high-frequency speaker, and the side surround speaker unit includes a full-frequency speaker.

In some embodiments, the present disclosure provides a speaker assembly, including a shell, a first speaker unit and a second speaker unit, wherein the shell has a cavity, the cavity has a baffle disposed therein, the cavity is divided into a first cavity and a second cavity by the baffle, and the first speaker unit and the second speaker unit are respectively located in the first cavity and the second cavity; wherein the first cavity is in fluid communication with outside, and at least one communicating pore for connecting the second cavity with the first cavity is disposed on the baffle.

In some embodiments, a phase-inverter tube for connecting the first cavity with the outside is disposed on the shell.

In some embodiments, the first speaker is configured to output sound in the first direction, the second speaker is configured to output sound in a second direction different from the first direction.

In some embodiments, the first direction is right in front of a display device, and the second direction is diagonally in front of the display device.

In some embodiments, a diameter of the communicating pore is between 0.5 mm and 2.0 mm.

In some embodiments, the communicating pore comprises a plurality of the communicating pores, and the diameter of the communicating pore is smaller than a thickness of the baffle.

In some embodiments, the diameter of the communicating pore is larger than 2.0 mm, and the communicating pore is covered with a damping screen.

In some embodiments, a communicating tube is disposed in and passes through the communicating pore for connecting the second cavity and the first cavity.

In some embodiments, the first speaker unit is a main channel speaker unit, and the second speaker unit is a side surround speaker unit.

The present disclosure provides a display device including the first panel, the second panel, the first rear housing, the second rear housing and the speaker assembly, wherein the first panel and the second panel may display different images, the speaker assembly mainly includes the shell, the first speaker unit and the second speaker unit, the shell has the cavity, by disposing the baffle in the cavity, the cavity is divided into the first cavity and the second cavity by the baffle, and the first speaker unit and the second speaker unit are respectively located in an independent cavity, so as to ensure a sound articulation.

By connecting the first cavity with the outside and disposing on the baffle the communicating pore for connecting the second cavity and the first cavity, the second cavity is able to communicate with the outside, therefore balancing the air pressure between inside and outside the shell, reducing the degree of distortion of the speaker, improving the reliability of the speaker, reducing the wind noise caused by the airflow, and improving the low-frequency effect of the speaker.

BRIEF DESCRIPTION OF THE DRAWINGS

In order to illustrate the embodiments of the present disclosure or the related art more clearly, the accompanying drawings that are required in the descriptions of the embodiments or the related art are briefly introduced below, and obviously, the accompanying drawings in description below are some of the embodiments of the present disclosure, for those skilled in the art, other accompanying drawings can also be obtained according to these accompanying drawings without any creative labor.

DESCRIPTION OF SIGNS OF DRAWINGS

1: a first panel; 2: a second panel; 3: a first backlight module; 4: a second backlight module; 5: a first rear housing; 6: a second rear housing; 7: a speaker assembly; 71: a shell; 711: a cavity; 7111: a first cavity; 7112: a second cavity; 712: a rib; 713: a vent; 72: a first speaker unit, a main channel speaker unit; 721: a full-frequency speaker; 722: a high-frequency speaker; 73: a second speaker unit, a side surround speaker unit; 731: a full-frequency speaker; 74: a baffle; 741: a communicating pore; 742: a damping screen; 8: a base.

DESCRIPTION OF EMBODIMENTS

In order to make the purpose, scheme and advantages of embodiments of the present disclosure clearer, embodiments of the present disclosure will be described clearly and completely below with reference to the accompanying drawings of embodiments of the present disclosure. Obviously, embodiments described are merely some embodiments of the disclosure, but not all of the embodiments. Based on the embodiments of the present disclosure, all the other embodiments obtained by those skilled in the art without any creative work fall within the protection scope of the present disclosure.

Figure 1:
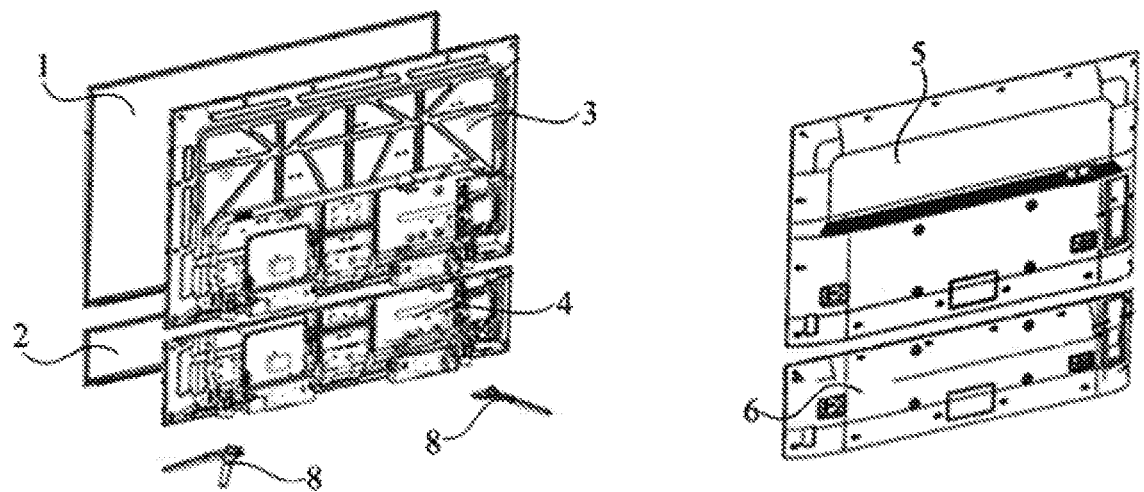
FIG. 1 is an explosive view of a display device according to an embodiment of the present disclosure.
Figure 2:
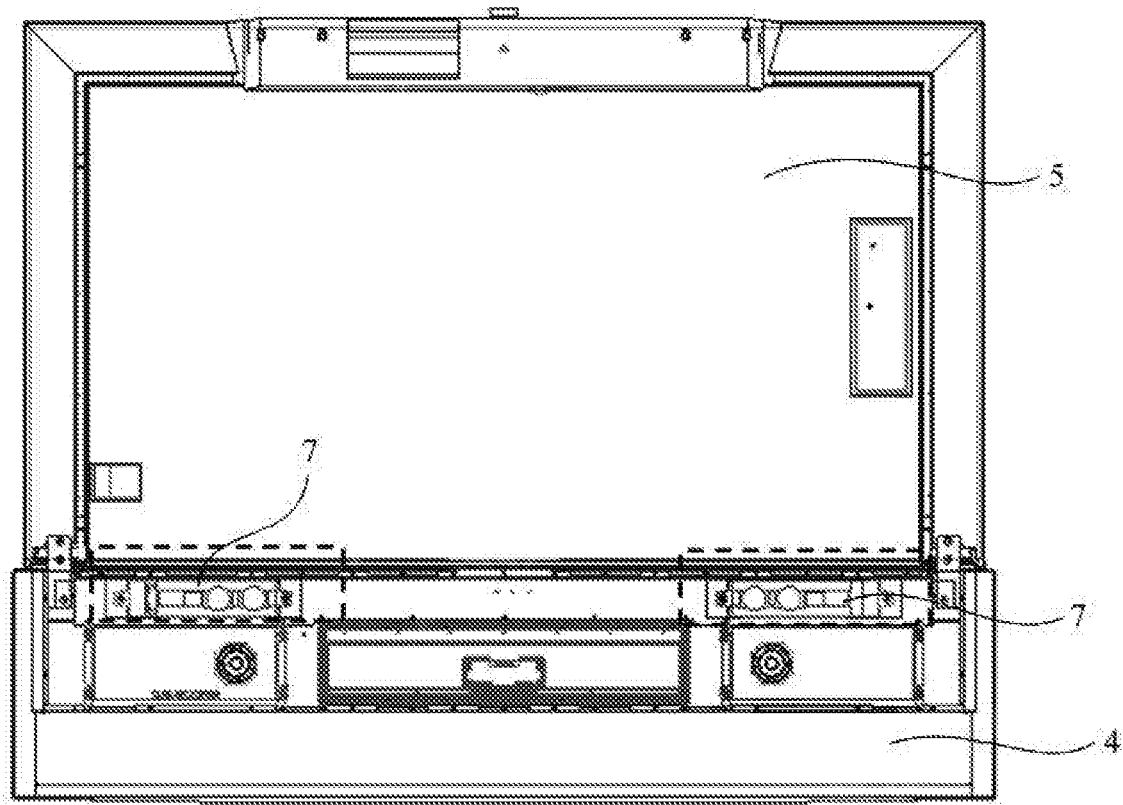
FIG. 2 is a partial perspective view of a display device according to an embodiment of the present disclosure.
Figure 3:
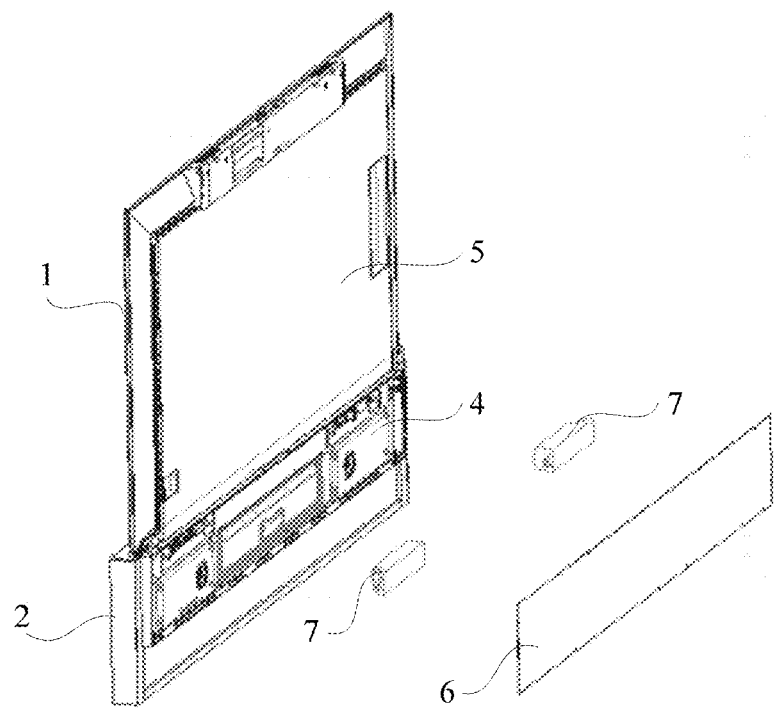
FIG. 3 is a partial explosive view of a display device according to an embodiment of the present disclosure.
Figure 4:
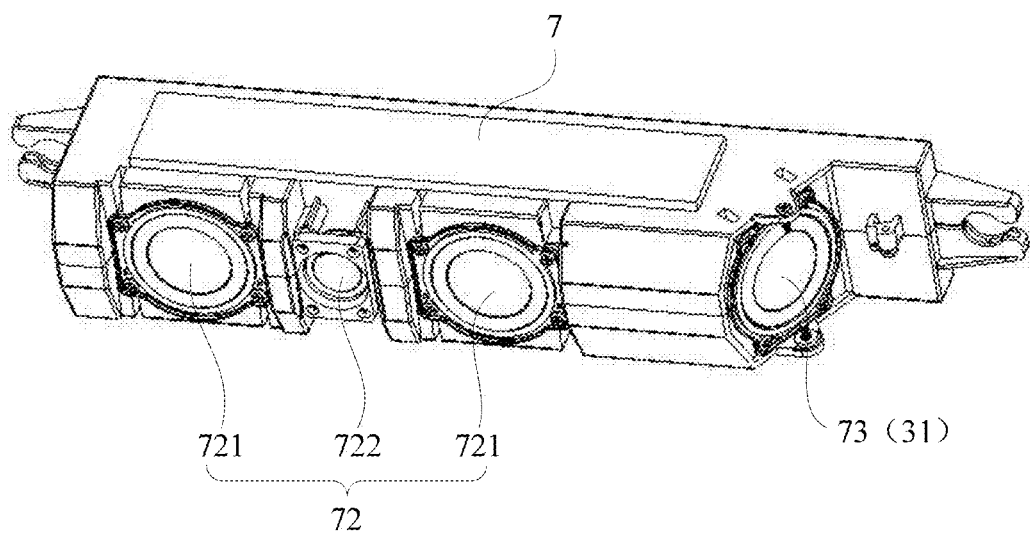
FIG. 4 is a schematic structural diagram of an integrated speaker.
Figure 5:
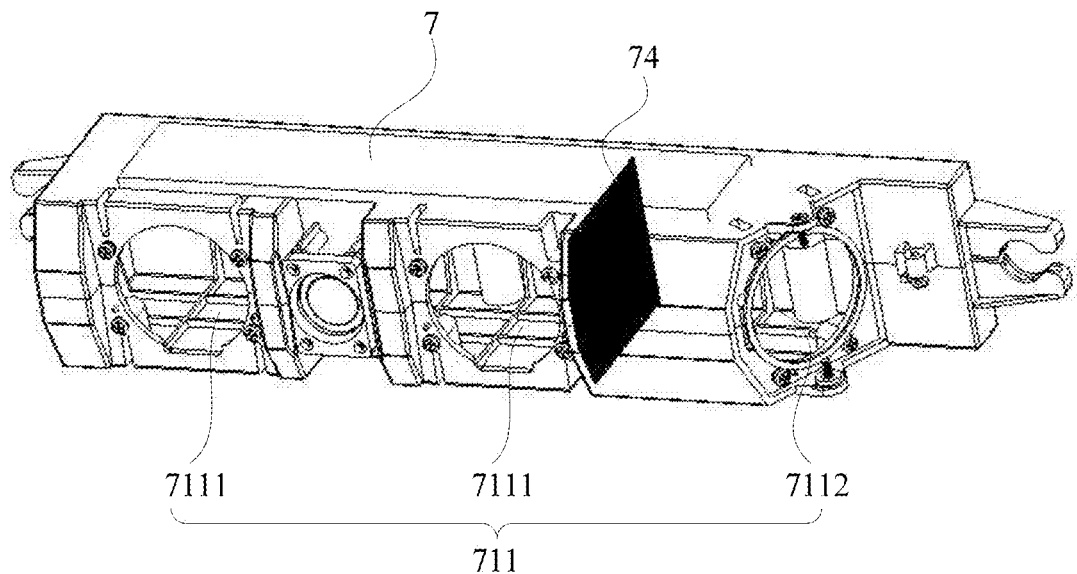
FIG. 5 is an internal perspective view of FIG. 4.
Figure 6:
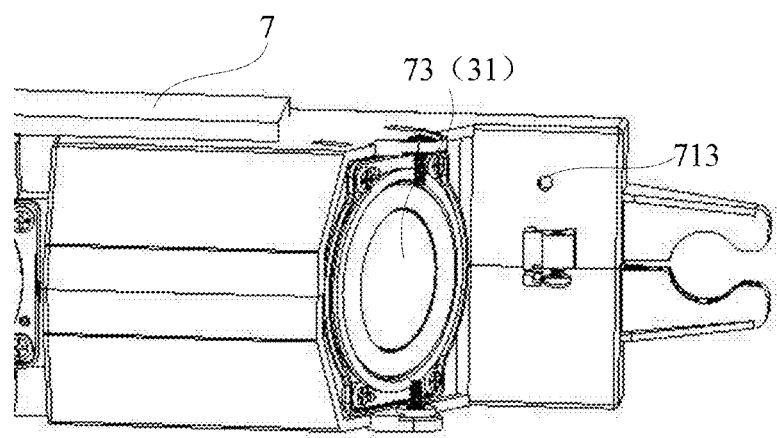
FIG. 6 is a partial structural diagram of another integrated speaker.

FIG. 1 is an explosive view of a display device according to an embodiment of the present disclosure; FIG. 2 is a partial perspective view of a display device according to an embodiment of the present disclosure; FIG. 3 is a partial explosive view of a display device according to an embodiment of the present disclosure; FIG. 4 is a schematic structural diagram of an integrated speaker; FIG. 5 is an internal perspective view of FIG. 4; FIG. 6 is a partial structural diagram of another integrated speaker.

Figure 7:
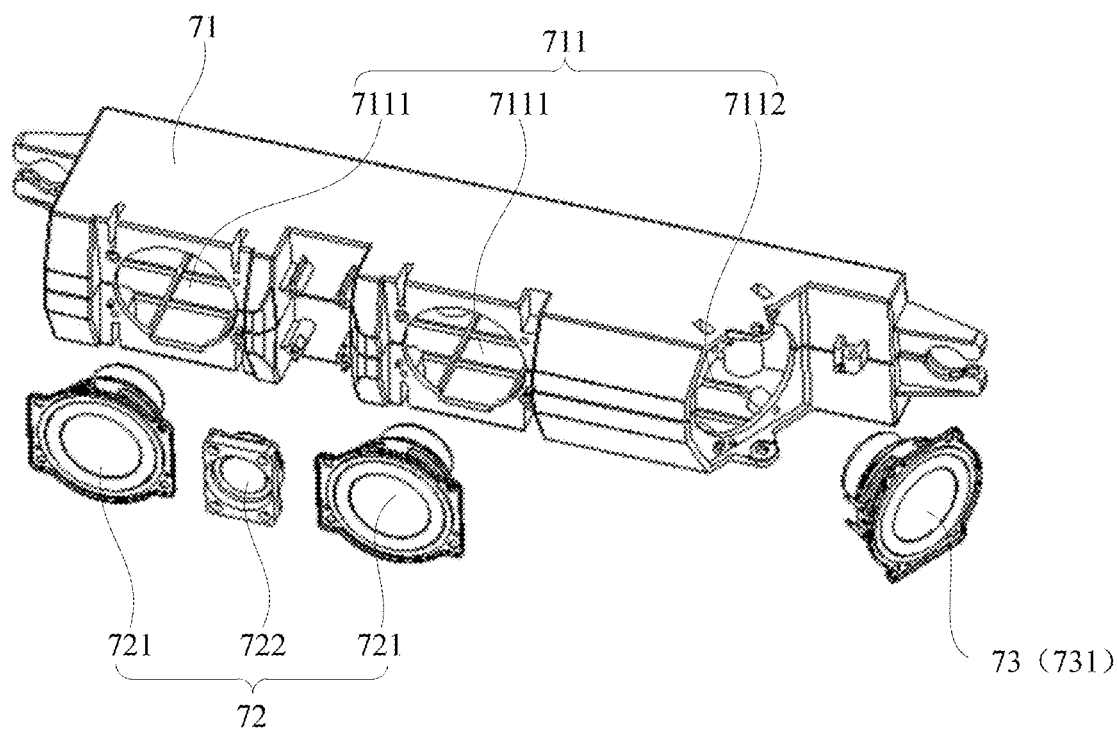
FIG. 7 is an explosive view of a speaker according to an embodiment of the present disclosure.
Figure 8:
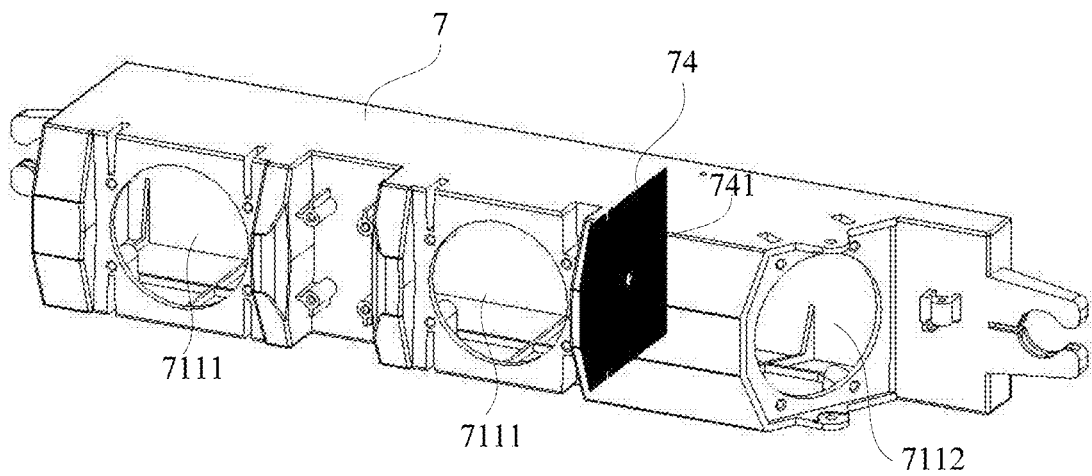
FIG. 8 is a schematic structural diagram of a shell of a speaker provided in an embodiment of the present disclosure.
Figure 9:
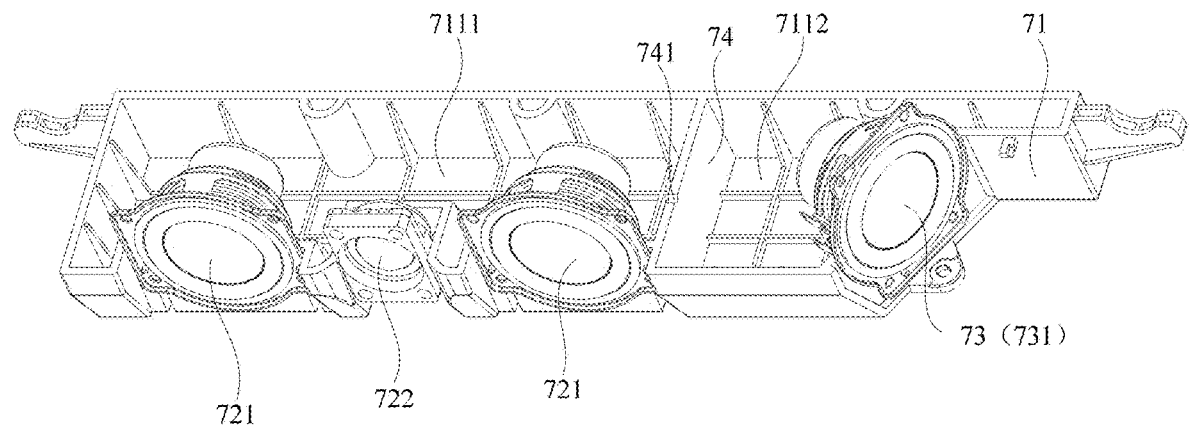
FIG. 9 is a section view of an internal structure of the speaker of FIG. 8.
Figure 10:
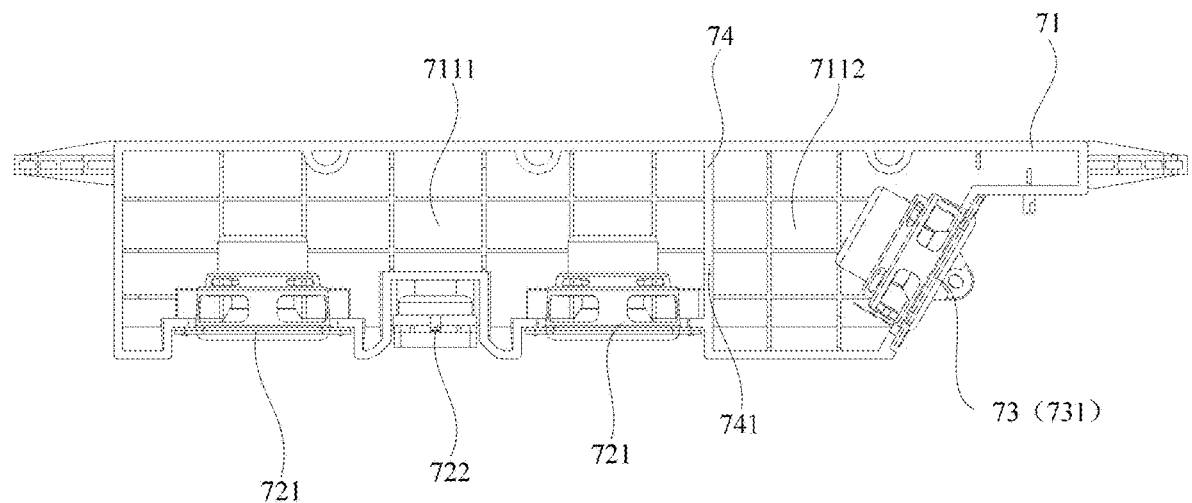
FIG. 10 is a top view of FIG. 9.
Figure 11:
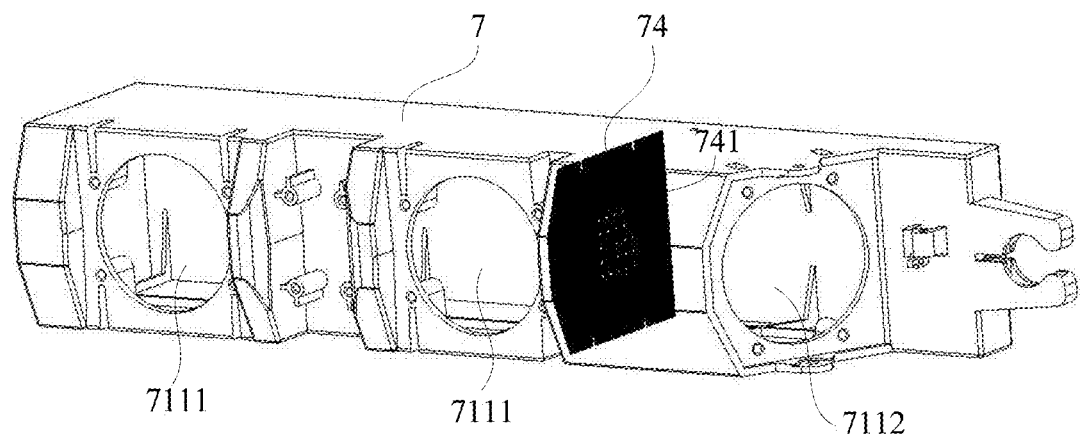
FIG. 11 is a schematic structural diagram of a shell of another speaker according to an embodiment of the present disclosure.
Figure 12:
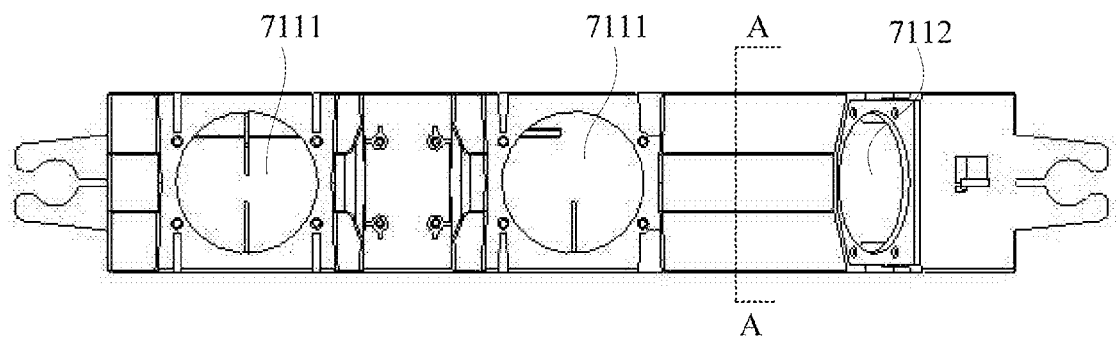
FIG. 12 is a front view of a shell of a speaker according to an embodiment of the present disclosure.
Figure 13:
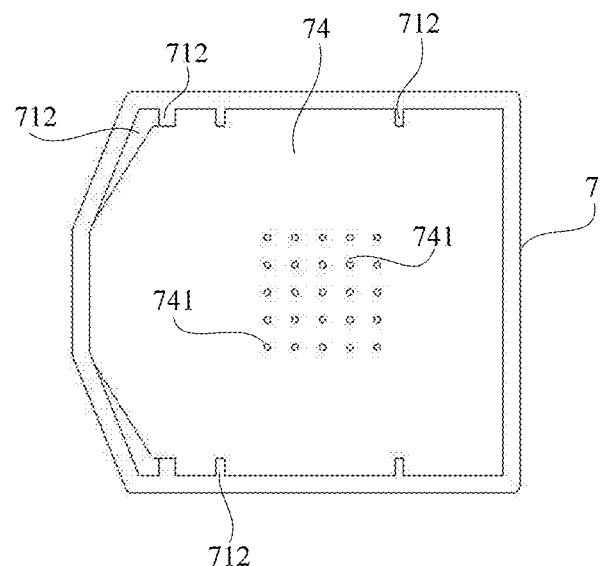
FIG. 13 is a section view of A-A section of FIG. 12.
Figure 14:
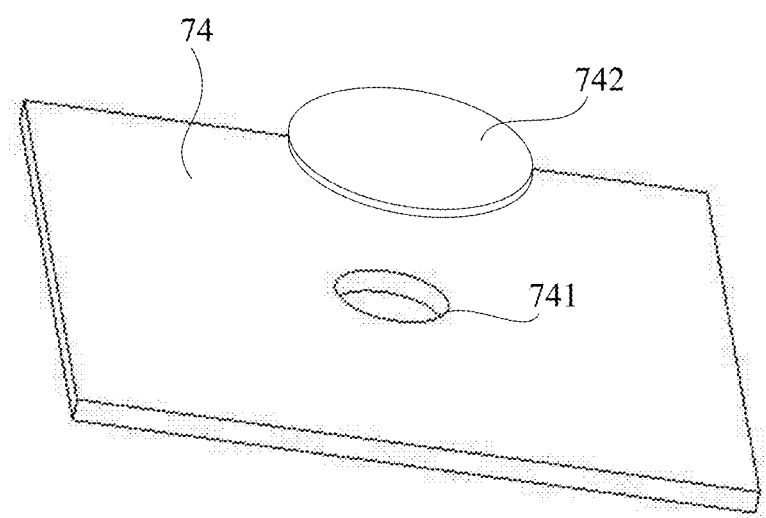
FIG. 14 is an explosive view of a baffle according to an embodiment of the present disclosure.
Figure 15:
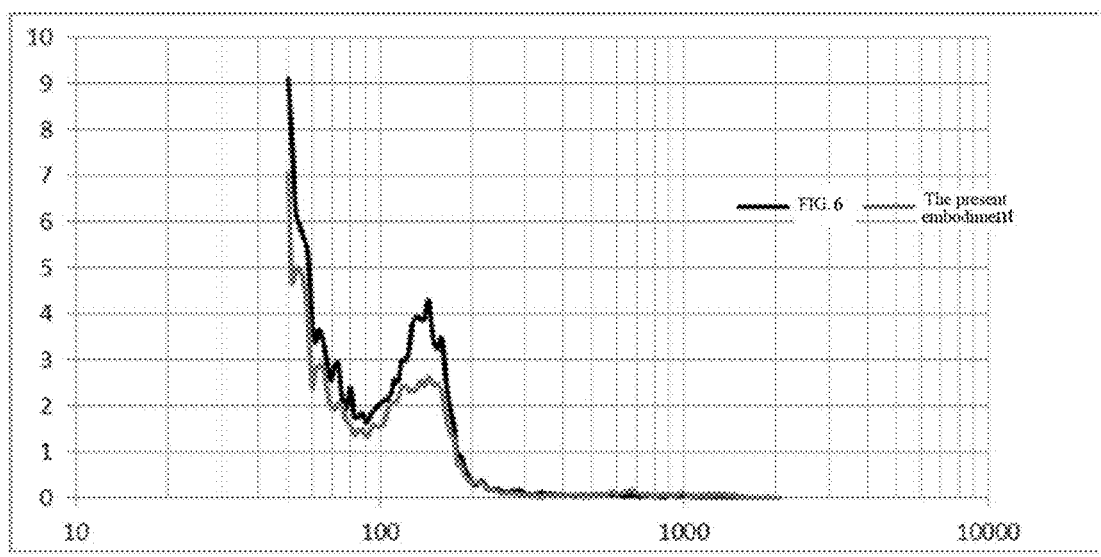
FIG. 15 is a comparison view of test data of high-order harmonic wave distortion of a speaker according to an embodiment of the present disclosure and the speaker illustrated in FIG. 6.

FIG. 7 is an explosive view of a speaker according to an embodiment of the present disclosure; FIG. 8 is a schematic structural diagram of a shell of a speaker according to an embodiment of the present disclosure; FIG. 9 is a sectional view of an internal structure of the speaker of FIG. 8; FIG. 10 is a top view of FIG. 9; FIG. 11 is a schematic structural diagram of a shell of another speaker according to an embodiment of the present disclosure; FIG. 12 is a front view of a shell of a speaker according to an embodiment of the present disclosure; FIG. 13 is a sectional view of A-A section of FIG. 12; FIG. 14 is an explosive view of a baffle according to an embodiment of the present disclosure; and FIG. 15 is a comparison view of test data of high-order harmonic wave distortion of a speaker according to an embodiment of the present disclosure and the speaker illustrated in FIG. 6.

As shown in FIG. 1 to FIG. 3, the present embodiment provides a display device, the display device includes a first panel 1 and a second panel 2, the first panel 1 is configured to display a first image, and the second panel 2 is configured to display a second image.

The display device of the present disclosure, in some embodiments, may be a liquid crystal display, an organic light emitting diode (Organic Light Emitting Diode, OLED) display or a projection display device; in other embodiments, the display device may be an intelligent television or a display system composed of a display and a set top box.

For the display device, there is no limitation on specific type, size, resolution and the like, and those skilled in the art would understand that some modifications can be made to performance and configuration of the display device as needed.

In addition to providing functions associated with broadcast signal receiving, the display device may additionally provide intelligent network television functions which are supported by computers, for example, including a network television, an intelligent television, an interne protocol television (IPTV) and the like. In some embodiments, the display device may have no functions associated with the broadcast receiving.

In the present embodiment, the display device includes the first panel 1 and the second panel 2, the first panel 1 and the second panel 2 may be configured to display different images. For example, the first panel 1 may be configured to display images from traditional television programs, and the second panel is configured to display images of addition information such as a notification message, a voice assistant and the like.

In some embodiments, the content displayed by the first panel 1 and the content displayed by the second panel 2 may be independent from and not affecting each other. For example, when the first panel 1 is playing a television program, the second panel 2 may display information that has no connection with the television program such as time, weather, temperature, reminders and the like.

In some embodiments, there may be associations between the content displayed by the first panel 1 and the content displayed by the second panel 2. For example, when the first panel is playing a main image of a video chat, the second panel 2 may display information associated with the users that are currently joining the video chat, such as a profile photo, chat time and the like.

In some embodiments, some or all of the content displayed on the second panel 2 may be moved to the first panel 1 to display. For example, the information displayed on the second panel 2, such as time, weather, temperature, reminders and the like, may be moved to the first panel 1 for display, while the second panel 2 displays other information.

In addition, the first panel 1 is able to display an image of multi-party interaction while displaying the image of traditional television programs, and the image of multi-party interaction does not cover the image of traditional television program. In the present embodiment, there is no limitation on how the image of traditional television program and the image of multi-party interaction display. For example, locations and sizes of the images of the traditional television program and multi-party interaction can be configured according to priorities of the images of traditional television program and the multi-party interaction.

Taking the example that the priority of the image of traditional television program is higher than the priority of the image of multi-party interaction, an area of the image of traditional telecast is larger than an area of the image of multi-party interaction, and the image of multi-party interaction may be located on one side of the image of traditional television program, or set to suspend in a corner of the image of traditional telecast program.

The display device may further include a first backlight module 3 and a second backlight module 4. The first backlight module 3 is located behind the first panel 1 and configured to provide a light source for the first panel 1; the second backlight module 4 is located behind the second panel 2 and configured to provide the light source for the second panel 2; and a first rear housing 5 is disposed covering the first panel 1 and a second rear housing 6 is disposed covering the second panel 2.

The first backlight module 3 located behind the first panel 1 usually includes a plurality of optical components and is configured to supply a light source of sufficient brightness and uniform distribution, so that the first panel 1 can display images normally. The first backlight module 3 may also include a first backboard (not shown). For the purpose of achieving an artistic appearance, the first rear housing 5 is disposed covering on the first panel 1 to house accessories of the display device such as the first backlight module 3 and the like.

The second backlight module 4 located behind the second panel 2 usually includes a plurality of optical components and is configured to supply a light source of sufficient brightness and uniform distribution, so that the second panel 2 can display images normally. The second backlight module 4 may also include a second backboard (not shown). For the purpose of achieving an artistic appearance, the second rear housing 6 is disposed covering the second panel 2 to house accessories of the display device such as the second backlight module 4 and the like.

It can be understood that, for an OLED display, since it has a self-luminous panel, the OLED display may merely include the first panel 1 and the second panel 2 while not include the first backlight module 3 and the second backlight module 4, which won't be repeatedly described here.

As shown in FIG. 1, the display device may also include a base 8, and the base 8 can support the display device at its bottom, so that the display device can be supported on a support structure such as the floor or a table to ensure a stability of the display device.

In addition, the display device may further include a sound reproduction device, for example a stereo component, such as a I2S interface including an amplifier (Amplifier, AMP) and the speaker and the like, which is configured to implement sound reproduction. Generally, the sound component can implement a sound output of at least two sound channels; when it needs to achieve Dolby Atmos effect, a plurality of sound components need to be disposed for outputting sound of multiple channels, which is not specifically described here.

The design of a conventional loudspeaker box, i.e. an enclosure of the speaker, can mainly be classified into three types, i.e., a closed-box, a phase inverter box and a passive-radiator box, and these three enclosures have their respective advantages and disadvantages. The closed-box is completely enclosed, air in the box and a cone of the speaker together form a good flexible system, so that a low-frequency noise can be avoided, but it may cause sound distortion and reliability issues due to an imbalance of air pressure between inside and outside of the box. For the phase-inverter box, by disposing an phase inverter aperture on the box, a part of sound energy transferred rearward via the speaker is transferred forward after being inverted and superposed with a front sound wave, which can improve sound output and extend a response frequency, therefore improving a low-frequency performance and facilitating design of a low-distortion performance, but it may cause the low-frequency wind noise; the passive-radiator box can achieve a good low-frequency performance and avoid the wind noise, but it has no advantages in cost.

A main channel speaker and a side surround speaker in the multiple channel speaker may be integrally designed, according to a conventional design, and in order to ensure a sound articulation of the side surround speaker, the above closed-box design may be adopted. The main channel speaker is mainly responsible for replaying sound of the main sound channel above 100 Hz, which has a relatively high requirement for the sound articulation and a certain requirement for low-frequency effect; the side surround speaker is mainly responsible for replaying sound of a surround sound channel, which doesn't have high requirements for the low-frequency effect, but has a relatively high requirement for the sound articulation of medium-high sound, and it is mainly responsible for an audio signal of surround sound above 300 Hz.

As shown in FIG. 4 and FIG. 6, when a main channel speaker unit 72 and a side surround speaker unit 73 are integrally designed, two speakers may be collectively disposed in one enclosure. By disposing a baffle 74 in a cavity of the enclosure, the cavity is divided into two independent rear cavities, and two speakers are disposed in the two independent rear cavities respectively, so as to achieve an integrative design of the main channel speaker unit 72 and the side surround speaker unit 73.

As shown in FIG. 4 and FIG. 5, the main channel speaker unit 72 may adopt a phase inverter box, the main channel speaker unit 72 may include two full-frequency speakers 721 and a high-frequency speaker 722, the two full-frequency speakers 721 share a rear cavity; the side surround speaker unit 73 may adopt a closed-box speaker, which may include a full-frequency speaker 721 and a closed rear cavity. The main channel speaker unit 72 and the side surround speaker unit 73 are separated by the baffle 74, and the rear cavity of the main channel speaker unit 72 and the rear cavity of the side surround speaker unit 73 are not connected to each other.

According to a design scheme as shown in FIG. 4 and FIG. 5, the main channel speaker unit 72 and the side surround speaker unit 73 are integrally designed, the number of moulds for the speakers is reduced, material shared by both of them is reasonably utilized, material for the speaker enclosure can be saved, which can reduce material, manufacture and installation cost of the speaker. By disposing a side surround sound channel in a closed and independent rear cavity, the closed box design is adopted for the side surround speaker unit 73, which is advantageous for improving the sound articulation. However, this design also results in an imbalance of air pressure between inside and outside of the rear cavity of the side surround speaker unit 73, which will increase the distortion of the speaker and reduce the reliability of the speaker.

In addition, in a case where the closed box of the speaker is a small box, insufficiency submergence of low-frequency response of the speaker may lead to an insufficient replaying effect of low-frequency sound.

As shown in FIG. 6, as for the phenomenon that the air pressure inside and outside of the rear cavity of the side surround speaker unit 73 is unbalanced according to the design scheme of the speaker as shown in FIG. 4 and FIG. 5, by opening a vent 713 on the enclosure of the rear cavity corresponding to the side surround speaker unit 73, the rear cavity of the side surround speaker unit 73 is in communication with the outside via the vent 713, thus the air pressure inside and outside of the closed box of the side surround speaker unit 73 can be balanced, and the distortion and reliability issues due to the imbalance of the air pressure inside and outside of the box can be mitigated.

However, since the vent 713 is disposed on the enclosure, an airflow through the vent 713 will lead to abnormal sounds, which will cause an increase of high harmonic wave distortion of the speaker. And, this scheme is not effective for a low-frequency extension of the main channel speaker unit 72.

Therefore, in view of the above, the display device according to the present embodiments further includes a speaker assembly 7, the speaker assembly 7 can provide performance optimization in a case where multiple sound channel speakers share an enclosure, and further balance the air pressure inside and outside of the speaker box and reduce the distortion of the speaker, improve the reliability of the speaker, and reduce the wind noise caused by the airflow, so that the low-frequency effect of the speaker can be improved.

As shown in FIG. 2, FIG. 3 and FIG. 7 to FIG. 15, the display device according to the present embodiments further includes the speaker assembly 7, the speaker assembly 7 may be disposed in the first rear housing 5, or the speaker assembly 7 may be disposed in the second rear housing 6.

Exemplarily, in order to improve a sound effect of the display device, the left and right side of the first rear housing 5 or the second rear housing 6 each may dispose a speaker assembly 7 respectively.

The speaker assembly 7 may include a shell 71, a first speaker unit 72 and a second speaker unit 73, the shell 71 has a cavity 711, the cavity 711 has a baffle 74 disposed therein, the cavity 711 is divided into a first cavity 7111 and a second cavity 7112 by the baffle 74, and the first speaker unit 72 and the second speaker unit 73 are respectively arranged in the first cavity 7111 and the second cavity 7112.

As shown in FIG. 7 to FIG. 11, the speaker assembly 7 according to the present embodiments includes the shell 71, the first speaker unit 72 and the second speaker unit 73, the shell 71 has a hollow structure, the first speaker unit 72 and the second speaker unit 73 may be fixed via the shell 71, and the first speaker unit 72 and the second speaker unit 73 may be extended into the shell 71, i.e. the first speaker unit 72, the second speaker unit 73 and the shell 71 together form the cavity 711.

By disposing the baffle 74 in the cavity 711, the cavity 711 can be divided into the first cavity 7111 and the second cavity 7112 by the baffle 74, thereby the first speaker unit 72 and the second speaker unit 73 can be disposed respectively in the first cavity 7111 and the second cavity 7112, the first speaker unit 72 and the second speaker unit 73 have respective first cavity 7111 and second cavity 7112 which are independent from each other, so that the speakers have a relatively good sound articulation.

In some embodiments, a phase-inverter tube for communicating the first cavity 7111 to the outside may be disposed on the shell 71. By disposing the phase-inverter tube on the shell 71 corresponding to the first cavity 7111, the first cavity 7111 are in communication with the outside by the phase inverter tube, for example, the shell 71 corresponding to the first cavity 7111 in which the first speaker unit 72 is arranged can form a phase inverter enclosure, so that the first speaker unit 72 has a performance similar to the phase-inverter enclosure, i.e. the first speaker unit 72 can have a relatively good low-frequency effect and a relatively low distortion.

Through the baffle 74, the second cavity 7112 forms a closed cavity, so that the shell 71 corresponding to the second cavity 7112 forms the closed-box enclosure, which can make the second speaker unit 73 located in the second cavity 7112 has a performance similar to the closed-box enclosure, i.e. the second speaker unit 73 can avoid the wind noise and improve the sound articulation. However, as foregoing described, since the second cavity 7112 forms the closed-box enclosure, the air pressures inside and outside of the second cavity 7112 are different from each other, which may cause distortion and reliability issues for the second speaker unit 73.

Therefore, in order to balance the air pressure difference between inside and outside of the second cavity 7112, and meanwhile avoid opening the vent 713 on the shell 71 corresponding to the second cavity 7112, and avoid the consequent abnormal sound caused by the airflow at the vent 713 and the consequent increase of the distortion of the high harmonic wave of the second speaker unit 73, in the present embodiments, the first cavity 7111 of the speaker assembly 7 is in fluid communication with the outside, and at least one communicating pore 741 for connecting the second cavity 7112 to the first cavity 7111 is disposed on the baffle 74.

By arranging the communicating pore 741 on the baffle 74, the communicating pore 741 can connect the second cavity 7112 and the first cavity 7111, which will balance the air pressure between the second cavity 7112 and the first cavity 7111, and meanwhile, since the phase-inverter tube is disposed on the shell 71 corresponding to the first cavity 7111, the first cavity 7111 is in communication with the outside via the phase-inverter tube, so that the second cavity 7112 can be communicated with the outside via the communicating pore 741 and the phase-inverter tube, the air pressure difference between inside and outside of the second cavity 7112 can be balanced, a reduction of the air pressure difference is advantageous for the distortion and reliability design of the second speaker unit 73, i.e. the distortion of the second speaker unit 73 can be reduced and the reliability of the second speaker unit 73 can be improved.

In addition, since the communicating pore 741 for connecting the second cavity 7112 to the outside is disposed on the baffle 74, the baffle 74 is located inside the cavity 711 of the shell 71, and by a triple damping of the communicating pore 741, the first cavity 7111 and the phase-inverter tube on the shell 71 corresponding to the first cavity 7111, the problem of wind noise caused by the airflow will not occur. Since an internal space of the first cavity 7111 is relatively large, even an airflow is generated at the communicating pore 741, as the airflow enters into the first cavity 7111, the flow rate of the airflow is significantly slowed down, further through the phase-inverter tube which is different in position and orientation from the communicating pore 741, the wind noise phenomenon due to the flow of the airflow can be significantly reduced.

Therefore, in the present embodiments, the speaker is ensured with a relatively good sound articulation by disposing the baffle 74 in the cavity 711 of the shell 71 to divide it into the first cavity 7111 and the second cavity 7112, and to cause the first speaker unit 72 and the second speaker unit 73 respectively and correspondingly located in the first cavity 7111 and the second cavity 7112; and meanwhile, by disposing the communicating pore 741 on the baffle 74, the second cavity 7112 and the first cavity 7111 is in communication via the communicating pore 741, and since the first cavity 7111 is in communication with the outside, the second cavity 7112 is in communication with the outside, thus the air pressure inside and outside of the second cavity 7112 can be balanced, a relatively high sound articulation of the second speaker unit 73 can be ensured, and the distortion of the second speaker unit 73 can be significantly reduced as well, and the reliability thereof can be improved, and the phenomenon of the wind noise can also be avoided.

In some embodiments, the phase-inverter aperture may be disposed on the shell 71 corresponding to the first cavity 7111, and the phase-inverter tube is disposed in the phase-inverter aperture by passing through it. With respect to how the shell 71 corresponding to the first cavity 7111 forms the phase-inverter enclosure, the phase-inverter aperture may be opened on the shell 71 corresponding to the first cavity 7111, by passing the phase-inverter tube through the phase-inverter aperture, the first cavity 7111 is in communication with the outside via the phase-inverter tube.

A front end of the phase-inverter tube may be located on a surface of the shell 71, for example, the front end of the phase-inverter tube is located on the front surface of the shell 71 corresponding to the first cavity 7111, i.e. a corresponding side surface of the shell 71 on which the first speaker unit 72 propagates the sound, and a rear end of the phase-inverter tube moves into the first cavity 7111 and extends close to the rear end of the first cavity 7111, so that the sound transmitted from the back of the first speaker into the first cavity 7111 can be propagated to the front surface via the rear end of the phase-inverter tube and superposed with the sound wave on the front surface of the first speaker unit 72, and collectively propagated forward to enhance the low-frequency effect of the first speaker unit 72.

As shown in FIG. 4 and FIG. 7, in some embodiments, the first speaker unit 72 may be the main channel speaker unit 72, and the second speaker unit 73 may be the side surround speaker unit 73. As described above, generally, the main channel speaker unit 72 and the side surround speaker unit 73 in the multiple channel soundbar may be integrally designed. In the present embodiments, the first speaker unit 72 and the second speaker unit 73 disposed in a shell 71 may respectively be the main channel speaker unit 72 and the side surround speaker unit 73.

The first speaker unit 72 is the main channel speaker unit 72, i.e. the main channel speaker unit 72 is located in the first cavity 7111. Since the main channel speaker unit 72 is mainly responsible for the reproduction of sound of the main sound channel above 100 Hz, which has a relatively high requirement for the sound articulation and a certain requirement for low-frequency effect, therefore by disposing the phase-inverter tube on the shell 71 corresponding to the first cavity 7111 in the present embodiment, the cavity of the main channel speaker unit 72 forms the phase-inverter enclosure, so as to meet the requirements of the main channel speaker unit 72 for the sound articulation, and meanwhile the low-frequency effect of the main channel speaker unit 72 can be improved.

The second speaker unit 73 is the side surround speaker unit 73, that is, the side surround speaker unit 73 is located in the second cavity 7112. Since the side surround speaker unit 73 is mainly responsible for the reproduction of sound of a surround sound channel above 300 Hz, which doesn't have high requirements for the low-frequency effect, but has a relatively high requirement for the sound articulation of medium-high sound, therefore the second cavity 7112 forms a closed cavity via the division of the baffle 74 in the present embodiment, the sound articulation of the side surround speaker unit 73 can be improved.

In addition, in order to avoid a situation where there is an air pressure difference between inside and outside of the cavity due to the second cavity 7112 being an closed cavity, by disposing the communicating pore 741 on the baffle 74 in the present embodiments, the second cavity 7112 and the first cavity 7111 are in communication via the communicating pore 741, the phase-inverter tube of the first cavity 71111 is in communication with the outside, thus the first cavity 7111 is connected with the outside via the phase-inverter tube, so that the second cavity 7112 is in communication with the outside via the communicating pore, thus the air pressure difference inside and outside of the second cavity 7112 can be balanced.

It can be understood that a diameter of the communicating pore 741 disposed on the baffle 74 should be set in a reasonable range, so that the balance of the air pressure difference between inside and outside of the second cavity 7112 can be ensured, and meanwhile it is necessary for the second cavity 7112 to form a relatively closed cavity, so as to ensure the sound articulation of the side surround speaker unit 73.

As shown in FIG. 11, by disposing the baffle 74 in the shell 71 and opening the communicating pore 741 on the baffle 74, the second cavity 7112 is in communication with the outside. Compared with opening the vent 713 on the shell of the rear cavity corresponding to the side surround speaker unit 73 as shown in FIG. 6, the distortion of the high harmonic wave of the speaker of the present embodiment is significantly reduced. It can be seen that the speaker of the present embodiment not only can reduce the wind noise, but also balance the air pressure difference between inside and outside of the second cavity 7112 where the side surround speaker unit 73 is located, the distortion of the speaker can be efficiently reduced, and the reliability of the speaker can be improved.

It should be noted that when the main channel speaker unit 72 is working in a low frequency, the side surround speaker unit 73 may not work, in that case, a vibration system of the side surround speaker unit 73 may act as a passive radiator of the main channel speaker unit 72, so that a low-frequency response of the main channel speaker unit 72 can be efficiently extended, the sound radiated from the back of the main channel speaker unit 72 propagates through the communicating pore 741 to the second cavity 7112 where the side surround speaker unit 73 is located, the side surround speaker unit 73 produces sound passively, thus the low-frequency effect of the main channel speaker unit 72 can be efficiently enhanced.

As shown in FIG. 7 to FIG. 10, specifically, the main channel speaker unit 72 may include two full-frequency speakers 721 and one high-frequency speaker 722, and the side surround speaker unit 73 may include a full-frequency speaker 731. In the present embodiment, the main sound speaker unit 72 may specifically comprise two full-frequency speakers 721 and a high-frequency speaker 722, thus the main channel speaker unit 72 can have a relatively good sound effect; the side surround speaker unit 73 may specifically be a full-frequency speaker 731, thus a frequency range of the sound signal that the side surround speaker unit 73 can output is relatively large.

With respect to the fix and connection of the main channel speaker unit 72 and the side surround speaker unit 73 on the shell 71, as shown in FIG. 7, in some embodiments, radiation ends of two full-frequency speakers 721 may be connected on the shell 71, vibration ends of two full-frequency speakers 721 may be located in the first cavity 7111, the high-frequency speaker 722 may be connected outside the shell 71; a radiation end of the full-frequency speakers 731 may be connected on the shell 71, a vibration end of the full-frequency speakers 731 may be located in the second cavity 7112.

By connecting the radiation ends of two full-frequency speakers 721 on the shell 71 and extending the vibration ends of two full-frequency speakers 721 into the first cavity 7111, two full-frequency speakers 721 can be fixed on the shell 71 and two full-frequency speakers 721 share the first cavity 7111. Since the shell 71 corresponding to the first cavity 7111 has the phase-inverter tube disposed thereon, the sound wave radiated from the back of two full-frequency speakers 721 can be radiated forward after being superposed with each other and then superposed with the sound wave radiated from front ends of two full-frequency speakers 721, so that a medium-low frequency effect of the main channel speaker unit 72 can be further improved; while the high-frequency speaker 722 may be individually connected and fixed outside the shell 71 since it doesn't need to superpose the sound wave.

The radiation end of the full-frequency speakers 731 may be connected on the shell 71 corresponding to the second cavity 7112, and the vibration end of the full-frequency speakers 731 may be extended into the second cavity 7112, thus the full-frequency speakers 731 is located in a relatively closed second cavity 7112, the full-frequency speaker 731 can have a relatively good sound articulation, so that a surround sound effect of the full-frequency speaker 731 can be improved.

The radiation end of the speaker is referred to as an end of the speaker that mainly radiates sound outward; the vibration end of the speaker is referred to as an end of the speaker that is disposed with a voice coil, sound is radiated outward by a vibration of the cone as a result of the vibration of the voice coil. In addition, the main channel speaker unit 72 may comprise the full-frequency speaker 731, wherein the present embodiment does not limit the components of the main channel speaker unit.

In some embodiments, the first speaker unit 72 may output sound in a first direction, the second speaker 73 may output sound in a second direction from the second direction. As shown in FIG. 7, the radiation ends of two full-frequency speakers 721 and a high-frequency speaker 722 in the main channel speaker unit 72 both orient to the first direction, i.e. the first speaker unit 72 outputs sound in the first direction; while the radiation end of the full-frequency speaker 731 in the side surround speaker unit 73 orients to the second direction, i.e. the second speaker unit 73 outputs sound in the second direction.

The first direction is different from the second direction, so that the side surround speaker unit 73 of the second speaker unit 73 outputs the sound in the second direction, and the sound propagating in the second direction may form a surround sound after going through a serial of reflections.

As shown in FIG. 7, the first direction may be right in front of the panel, and the second direction may be diagonally in front of the panel.

By connecting the radiation ends of two full-frequency speakers 721 and one high-frequency speaker 722 of the first speaker unit 72 to the front surface of the shell 71, the first speaker unit 72 can radiate sound toward in front of the front surface of the speaker assembly 7, so that a listener in front of the speaker assembly 7 is able to hear the sound from the main sound channel with more clarity and better effect.

By connecting the radiation end of the full-frequency speaker 731 of the second speaker unit 73 to a side wall of the shell 71, the side wall of the shell 71 may incline to the front surface of the shell 71, so that the first speaker unit 72 can radiate sound toward diagonally in front of the front surface of the speaker assembly 7, and the sound propagating diagonally in front of the front surface of the speaker assembly 7 is reflected by an object such as a wall to form the surround sound.

The front surface of the speaker assembly 7 may face the front surface of the display device, so that a listener can hear the sound with more clarity and better effect when standing right in front of the display device.

As shown in FIG. 7 and FIG. 8, specifically, the diameter of the communicating pore 741 may be between 0.5 mm to 2.0 mm. Thus, the communicating pore has a relatively small diameter, the second cavity 7112 and the first cavity 7111 are in communication via the communicating pore 741, meanwhile the second cavity 7112 can maintain a relatively closed space, therefore a relatively good sound articulation of the second speaker unit 73 can be ensured. Exemplarily, the diameter of the communicating pore 741 may be 0.6 mm, 0.8 mm, 1.2 mm or 1.5 mm and the like.

In some embodiments, there may be a plurality of the communicating pores 741, and the diameter of the communicating pore 741 is smaller than a thickness of the baffle 74. As shown in FIG. 8, in the present embodiment, merely one communicating pore 741 may be disposed on the baffle 74, or, as shown in FIG. 11, a plurality of the communicating pores 741 may be disposed on the baffle 74, and the pore diameters of all the communicating pores 741 are smaller than the thickness of the baffle 74, so that each communicating pore 741 may be equivalent to a thin tubular structure, which has a relatively good damping effect on the air, and when the communicating pore communicates the second cavity 7112 with the first cavity 7111, the wind noise can be further reduced.

In some embodiments, as shown in FIG. 11 and FIG. 13, a plurality of communicating pores 741 on the baffle 74 may be arranged as a matrix. As for a specific number of the communicating pores and how they arrange, the present embodiments have no intention to limit these subject matters. In addition, a rib 712 may be disposed in a position on an internal wall of the shell 71 corresponding to the baffle 74, the baffle 74 can be further fixed via the rib 712, improving the connection strength between the baffle 74 and the internal wall of the shell 71.

In addition to controlling the diameter of the communicating pore 741 in a relatively small range, as shown in FIG. 14, in another alternative implementation, the diameter of the communicating pore 741 may be larger than 2.0 mm, and a damping screen 742 may be covered on the communicating pore 741.

In the present embodiments, the diameter of the communicating pore 741 on the baffle 74 may be set to be slightly larger, for example, the diameter of the communicating pore 741 is larger than 2.0 mm, so that the communicating pore 741 can be easily processed on the baffle 74. Meanwhile, in order to avoid the communicating pore being over large, which reduces the sealing-ability of the second cavity 7112, the damping screen 742 may be disposed on the communicating pore 741. The communicating pore 741 is divided into a plurality of small pores by the damping screen 742, the diameter of a plurality of small pores is small, then by the combination of the communicating pore 741 and the damping screen 742, a good damping effect on the air can be obtained, so as to ensure that the second speaker unit 73 is located in the second cavity 7112 which is relatively closed, and the wind noise can be reduced.

In addition, as for the case where the diameter of the communicating pore 741 is relatively large, in some embodiments, the communicating pore 741 may have a communicating tube for communicating the second cavity 7112 and the first cavity 7111. As for the case where the diameter of the communicating pore processed on the baffle 74 is relatively large, the communicating pore 741 may also have the communicating tube passed therein, one end of the communicating tube is located in the first cavity 7111, the other end thereof is located in the second cavity 7112, and the second cavity 7112 and the first cavity 7111 is communicated via the communicating tube.

There is no limitation to the diameter of the communicating pore 741, and an outside wall of the communicating tube is abutted against the inside wall of the communicating pore 741, then the second cavity 7112 is in communication with the first cavity 7111 via the communicating tube. Since the communicating tube has a certain length, the communicating tube has a better air damping effect compared with the communicating pore 741, and the wind noise can be efficiently reduced by communicating the second cavity 7112 and the first cavity 7111 via a relatively long tube.

FIG. 15 is a comparison view of test data of high-order harmonic wave distortion of a speaker according to an embodiment of the present disclosure and the speaker illustrated in FIG. 6. The horizontal axis of FIG. 15 shows the frequency (Hz), the vertical axis shows the amplitude of signal distortion (%), and the curves show change values of the amplitude of signal distortion relative to the frequency. The less these change values are, the better. From FIG. 15, it can be seen that the degree of distortion of the speaker according to the embodiment of the present disclosure is reduced, and the reliability of the speaker is improved.

The present embodiments provide a display device, including a first panel, a second panel, a first rear housing, a second rear housing and a speaker assembly, the first panel and the second panel may display different images, the speaker assembly mainly includes a shell, a first speaker unit and a second speaker unit, the shell has a cavity, by disposing a baffle in the cavity, the cavity is divided into a first cavity and a second cavity by the baffle, the first speaker unit and the second speaker unit are respectively located in the first cavity and the second cavity, so that the first speaker unit and the second speaker unit are respectively located in its individual cavity, so as to ensure a sound articulation. By communicating the first cavity with the outside and disposing on the baffle a communicating pore which connecting the second cavity with the first cavity, the second cavity can be in communication with the outside, which is able to balance the air pressure between inside and outside of the shell, reduce the distortion of the speaker, improve the reliability of the speaker, reduce the wind noise caused by the airflow, and improve the low-frequency effect of the speaker.

In some embodiments, the present disclosure further provides a speaker assembly 7, which includes the shell 71, the first speaker unit 72 and the second speaker unit 73, the shell 71 has the cavity 711, the cavity 711 has a baffle disposed therein, the cavity is divided into a first cavity and a second cavity by the baffle, the first speaker unit and the second speaker unit are respectively located in the first cavity and the second cavity; the first cavity is in communication with outside, and at least one communicating pore for connecting the second cavity with the first cavity is disposed on the baffle.

In the present embodiments, the speaker assembly 7 may be disposed in the first rear housing 5 or the second rear housing 6 of the display device described in the present embodiments, and in order to improve the sound effect of the display device, the left and right side of the first rear housing 5 or the second rear housing 6 each arranges a speaker assembly 7.

A specific structure, function and working principle of the speaker assembly 7 are described in foregoing embodiments, which will be omitted herein.

The speaker assembly according to the present embodiments mainly includes a shell, a first speaker unit and a second speaker unit, the shell has a cavity, by disposing a baffle in the cavity, the cavity is divided into a first cavity and a second cavity by the baffle, the first speaker unit and the second speaker unit are respectively arranged in the first cavity and the second cavity, so that the first speaker unit and the second speaker unit are respectively located in its individual cavity, so as to ensure a sound articulation. By communicating the first cavity with the outside and disposing on the baffle a communicating pore for connecting the second cavity and the first cavity, the second cavity is able to communicate with the outside, therefore balancing the air pressure between inside and outside of the shell, reducing the distortion of the speaker, improving the reliability of the speaker and the wind noise caused by the airflow, and improving the low-frequency effect of the speaker.

Finally, it should be noted that above-described various embodiments are merely used for illustrating the present disclosure, but should not be construed as limiting the present disclosure; although the present disclosure is described in detail with reference to the foregoing embodiments, those skilled in the art should understand that modifications may still be made to the schemes described in foregoing various embodiments, or equivalents may be made to a part or all of the schemes therein; while these modifications or equivalents should not be construed departing from the scope of the schemes of the various embodiments of the present disclosure.

What is claimed is:

1. A display device, comprising:
    a first panel, configured to display a first image;
    a second panel, configured to display a second image;
    a first rear housing, configured to cover the first panel;
    a second rear housing, configured to cover the second panel; and
    a speaker assembly, configured to locate in at least one of the first rear housing and the second rear housing, wherein the speaker assembly comprises a first speaker unit and a second speaker unit.

2. The display device according to claim 1, wherein the speaker assembly further comprises a shell with a cavity, and the cavity has a baffle disposed therein, the cavity is divided into a first cavity and a second cavity by the baffle, and the first speaker unit and the second speaker unit are respectively located in the first cavity and the second cavity;
    wherein the first cavity is in communication with outside, and at least one communicating pore for connecting the second cavity with the first cavity is disposed on the baffle.

3. The display device according to claim 2, wherein a phase-inverter tube for connecting the first cavity with the outside is disposed on the shell.

4. The display device according to claim 3, wherein the first speaker unit is configured to output sound in a first direction, the second speaker unit is configured to output sound in a second direction different from the first direction.

5. The display device according to claim 4, wherein the first direction is right in front of the display device, and the second direction is diagonally in front of the display device.

6. The display device according to claim 2, wherein a diameter of the communicating pore is between 0.5 mm and 2.0 mm.

7. The display device according to claim 6, wherein the communicating pore comprises a plurality of the communicating pores, and the diameter of the communicating pore is smaller than a thickness of the baffle.

8. The display device according to claim 2, wherein a diameter of the communicating pore is greater than 2.0 mm, and the communicating pore is covered with a damping screen.

9. The display device according to claim 2, wherein the communicating pore has a communicating tube for connecting the second cavity and the first cavity.

10. The display device according to claim 2, wherein the first speaker unit is a main channel speaker unit, and the second speaker unit is a side surround speaker unit.

11. The display device according to claim 10, wherein the main channel speaker unit comprises two full-frequency speakers and a high-frequency speaker, and the side surround speaker unit comprises a full-frequency speaker.

12. A speaker assembly, comprising a shell, a first speaker unit and a second speaker unit, wherein the shell has a cavity with a baffle, the cavity is divided into a first cavity and a second cavity by the baffle, and the first speaker unit and the second speaker unit are respectively located in the first cavity and the second cavity;
    wherein the first cavity is in communication with outside, and at least one communicating pore for connecting the second cavity with the first cavity is disposed on the baffle;
    wherein a phase-inverter tube for communicating the first cavity with the outside is disposed on the shell.

13. The speaker assembly according to claim 12, wherein the first speaker is configured to output sound in the first direction, the second speaker is configured to output sound in a second direction different from the first direction.

14. The speaker assembly according to claim 13, wherein the first direction is right in front of a display device, and the second direction is diagonally in front of the display device.

15. The speaker assembly according to claim 12, wherein a diameter of the communicating pore is between 0.5 mm and 2.0 mm.

16. The speaker assembly according to claim 15, wherein the communicating pore comprises a plurality of the communicating pores, and the diameter of the communicating pore is smaller than a thickness of the baffle.

17. The speaker assembly according to claim 12, wherein a diameter of the communicating pore is larger than 2.0 mm, and the communicating pore is covered with a damping screen.

18. The speaker assembly according to claim 12, wherein the communicating pore has a communicating tube for connecting the second cavity and the first cavity.

19. The speaker assembly according to claim 12, wherein the first speaker unit is a main channel speaker unit, and the second speaker unit is a side surround speaker unit.

* * * * *